United States Patent [19]
Ridenour et al.

[11] 3,803,897
[45] Apr. 16, 1974

[54] COMPRESSION STAKING APPARATUS

[75] Inventors: Ralph G. Ridenour; Walter Chandler Stevens, Jr., both of Mansfield, Ohio

[73] Assignee: Universal Refrigeration, Inc., Mansfield, Ohio

[22] Filed: May 4, 1972

[21] Appl. No.: 250,255

Related U.S. Application Data
[62] Division of Ser. No. 123,255, March 11, 1971, Pat. No. 2,744,122.

[52] U.S. Cl.................. 72/412, 29/516, 72/470
[51] Int. Cl............................................. B21d 37/10
[58] Field of Search ............ 72/412, 415, 470, 410; 29/516, 508

[56] References Cited
UNITED STATES PATENTS

| | | | |
|---|---|---|---|
| 2,567,155 | 9/1951 | Macy | 72/470 |
| 3,055,412 | 9/1962 | Dibner | 72/470 |
| 3,576,122 | 4/1971 | Churla | 72/470 |

*Primary Examiner*—Charles W. Lanham
*Assistant Examiner*—Gene P. Crosby
*Attorney, Agent, or Firm*—Woodling, Krost, Granger & Rust

[57] ABSTRACT

A pair of mating dies is disclosed to establish a compression staked surface on the outer malleable wall of inner and outer telescoped tubular parts with the compression staked surface having a radially compressed area and a toothed area and establishing a zig-zag seal path between the inner and outer tubular parts which is fluid pressure tight and also resists longitudinal and torsional force between the parts.

15 Claims, 10 Drawing Figures

COMPRESSION STAKING APPARATUS

RELATED APPLICATIONS

This application is a division of our prior pending patent application Ser. No. 123,255, filed Mar. 11, 1971 for "Compression Staked Seal For Tubular Parts", now U.S. Pat. No. 2,744,122.

BACKGROUND OF THE INVENTION

Compression staking of two relatively telescoped parts has been done in many ways especially with wire or cable connecting sleeves which are compressed onto the wire or cable to make a longitudinal force resistant connection. The opposed compression dies have a non-uniform shape so as to make a depression in the outer tubular part and deform it into the inner part which is the wire or cable and thus to make a good physical connection. A typical connection is to make a series of regular indentations along the longitudinal length of the connector sleeve, sufficiently deep to assure that the outer sleeve is deformed into the inner wire.

It has also been known to use a pair of mating dies for crimping a connector sleeve onto a cable with a die having a plurality of long fingers with spaces inbetween so that the fingers of one die fit into the space between the fingers of the other die, however, this produces a series of laterally off-set generally semi-circular indentations in the connector sleeve and with these semi-circular indentations being alternately on one side and alternately on the other side of the connector sleeve.

Also it has been known to use compression dies on tubular parts carrying a fluid but these have often used an outer ferrule or else the inner tubular part has to be specially prepared with sharp annular grooves onto which the outer tube is compressed. In such prior art systems of attempting to join inner and outer tubular parts carrying a fluid under pressure, it has been found very difficult to obtain a fluid pressure tight seal. Primarily the leakage occurs along two longitudinal paths 180° apart which occur primarily because of the junction between the mating surfaces of the two dies. Generally there is an unavoidable flash or radial extrusion of the material of the wall of the outer tube at this junction of the two mating dies. This is because the radius of the recess in the dies necessarily must be less than the initial radius of the outer tubular part, in order to have the die effective in radially compressing the outer part onto the inner part. This radial extrusion or flash has resulted in an imperfect seal between the inner and outer parts along two generally longitudinal junction lines at the junction between the two dies.

Accordingly, an object of the invention is to provide a fluid pressure tight seal between inner and outer tubular parts.

Another object of the invention is to provide mating compression dies with long and short fingers to intermesh and provide a toothed area on telescoped tubular parts to be connected.

Another object of the invention is to provide a method of joining two telescoped tubular parts in a fluid tight seal by means of a zig-zag seal path which extends longitudinally and circumferentially.

Another object of the invention is to provide a compression staked seal between two tubular parts with a compression staked surface having an interrupted toothed area forming a herringbone pattern.

SUMMARY OF THE INVENTION

The invention may be incorporated in apparatus for compression staking radially inner and outer tubular parts for a fluid pressure tight seal, comprising, in combination, a first die and a second die, a recess in the confronting edge of each said die to receive the tubular parts, each of said dies including at least first and second adjacent fingers, said first finger of said first die being shorter than said second finger of said first die so that said first finger protrudes in the direction of said second die, said first finger of said second die being longer than said second finger of said second die to protrude in the direction of said first die, said longer fingers complementarily intermeshing with the shorter fingers of the opposing die, whereby said dies may be moved together to close on the tubular parts in the space defined by said recesses to form on the outer wall of the outer tubular part a compression staked surface with a radially compressed area and a toothed area having protruding teeth with a zig-zag length greater than the longitudinal length of said dies.

The apparatus may be used in a method to fasten together two telescoped tubular parts by means of two dies and the resulting article is that which has a compression staked seal between inner and outer tubular parts by means of interrupted teeth on the outer wall of the outer tubular part.

Other objects and a fuller understanding of the invention may be had by referring to the following description and claims, taken in conjunction with the accompanying drawing.

DESCRIPTION OF THE PREFERRED EMBODIMENT

Figure 1:
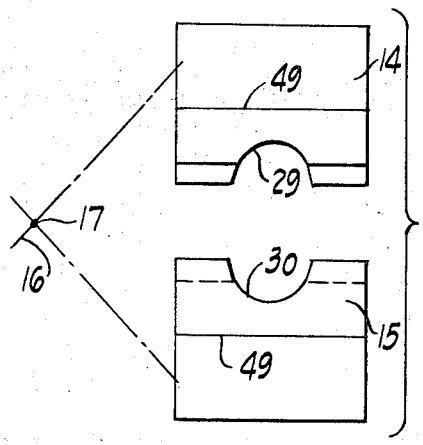
FIG. 1 is a front elevation of mating dies forming the apparatus to perform a compression staked seal of the invention.
Figure 2:
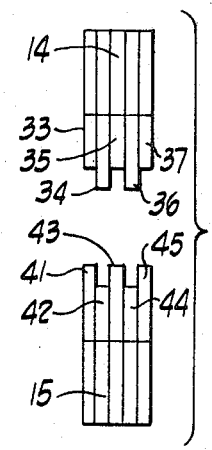
FIG. 2 is an end view of the dies of FIG. 1.

FIGS. 1-5 show an apparatus for compression staking of radially inner and outer tubular parts to establish a fluid pressure tight seal therebetween. This apparatus includes a first die 14 and a second die 15 cooperable together by some means 16 illustrated as a plier-like tool pivoted at 17 and connected to the dies 14 and 15 to move them closer together and away from each other. Any suitable tool 16 such as a hydraulically operated device may be used with this apparatus 14,15.

FIGS. 6 through 10 show the relatively telescoped inner and outer tubular parts on which the compression staked seal may be applied. An inner part 21 and an outer part 22 telescoped thereover are shown in FIG.

Figure 10:
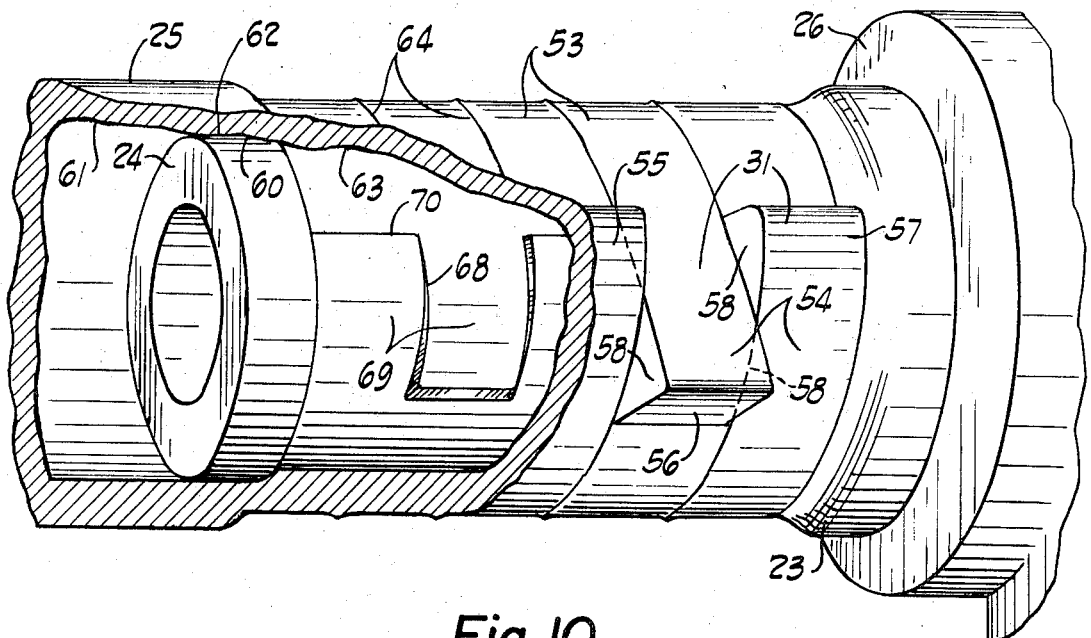
FIG. 10 is an enlarged isometric view, partly broken away, of the compression staked seal on telescoped tubular parts.

7. The inner part 21 may be a part of a fitting such as a T or elbow fitting and the outer part 22 may be a tube to be sealed to and connected to this fitting 21. FIG. 10 illustrates a slightly different form of a fitting 23 having an inner male tubular part 24 and an outer part is a tube 25 telescoped over this male part 24 up to a shoulder 26.

Figure 4:
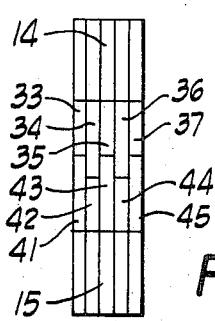
FIG. 4 is an end elevation of the closed dies.
Figure 5:
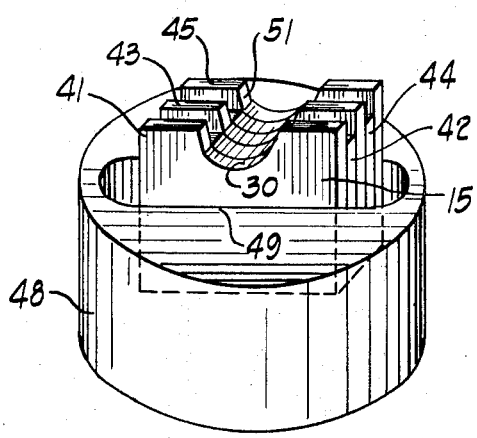
FIG. 5 is an isometric view of one of the dies in a die-holder.
Figure 6:
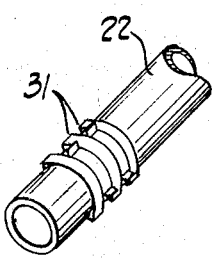
FIGS. 6, 7 and 8 are views of different tubular parts on which the compression staked seal has been applied.

FIGS. 1–5 show the first and second dies 14 and 15 as each having a substantially semi-cylindrical recess 29 and 30, respectively, in the confronting edge of each of these dies and so shaped as to receive the telescoped tubular parts. The radius of these recesses 29 and 30 is less than the initial radius of the outer tubular part 22 or 25. This is so that a compression staked surface 31 will be established on the outer malleable wall of the outer tubular part. FIG. 6 shows an isometric view of the outer tubular part 22 on which the compression staked surface 31 has been applied.

Figure 3:
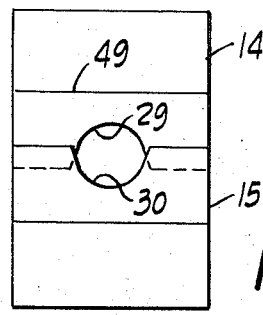
FIG. 3 is a front elevational view with the dies in closed position.

Each of the dies includes at least first and second fingers and in this preferred embodiment each die has been shown with a total of five fingers. The first die 14 has first, third and fifth fingers 33, 35 and 37, respectively, which are shorter than second and fourth fingers 34 and 36, respectively. The second die 15 is an opening or mating die and has first, third and fifth fingers 41, 43 and 45, respectively, which are longer than second and fourth fingers 42 and 44, respectively. The first through fifth fingers on each die are adjacent to each other in the order named, and accordingly, when the dies close upon each other as shown in FIGS. 3 and 4, the longer fingers intermesh with the shorter fingers of the opposing die or alternatively it may be considered that the longer fingers intermesh with the space between the longer fingers of the opposing die.

The various fingers may be made from individual pieces of material or there may be plural pieces in each finger or alternatively the entire block may be made from one unitary piece of material or may be made integral by welding or the like. FIG. 5 illustrates a holder 48 holding one of the dies 15 and such holder may be provided for each of the two dies for use in the compression means or plier-like tool 16. The holder 48 holds the die 15 up to a line 49 which line has been shown on FIGS. 1 through 4.

Making these individual die fingers from separate pieces of metal, as shown in this preferred embodiment, permits them to be easily fabricated, for example, from stamped sheet metal parts. This is a simple and quick means to form the die at low cost and yet to achieve the longer and shorter fingers without much expensive die work.

The recesses 29 and 30 in the two dies 14 and 15 may be identical, and the recess 30, especially FIG. 5 will be described in detail. The radius of the recess 30 is slightly smaller than the initial radius of the outer part 22 to be staked, in order to provide a radial compression on this outer part 22. The first, third and fifth fingers 41, 43 and 45, respectively, have diverging walls 51 adjacent the recess 30. Each of the pairs of fingers, with a finger on either side of the recess, are the same for each individual plate forming the die. The length of the pair of fingers 41 is such that they circumscribe more than 180° of the outer tubular part 22. Conversely the length of the pair of shorter fingers 42 is such that they circumscribe less than 180° of the outer tubular part 22.

FIG. 10 is an enlarged isometric view partly in section of the compression staked seal on the inner and outer tubular parts 24 and 25, respectively. The compression staked surface 31 includes two general areas, a radially compressed area 53 and a toothed area 54. The radially compressed area 53 is caused when the dies are closed upon each other as in FIGS. 3 and 4 and the smaller radius of the recesses 29 and 30 relative to the initial radius of the outer tubular part 22, causes this radial compression at area 53. The toothed area 54 has a plurality of teeth 55 each formed by the intermeshing action of the longer and shorter fingers 33-45. Each tooth 55 has a number of walls including a junction wall 56, a merging wall 57 and at least one shear wall 58. A shear wall is on each side of a tooth which is adjacent a tooth on opposite sides. For the end teeth in a series, with five being shown in this preferred embodiment, there is no shear wall on the outer edges because there is no die finger having a shearing action relative to an adjacent finger in the opposing die. It is the confronting ends of the shorter fingers which establish the junction walls 56, and it is the diverging walls 51, together with the confronting ends of the longer fingers which contain the extruded malleable material, which form the merging walls 57. These walls in the preferred embodiment merge relatively smoothly with the annular wall of the tubular part at the radially compressed areas 53. In this preferred embodiment there are two toothed areas and two radially compressed areas around the circumferential extent of the compression staked surface 31. If three dies were to cooperate upon a pair of telescoped tubular parts, then there would be three toothed areas and three radially compressed areas. The shear walls 58 are established by the shearing action of the longer fingers as they intermesh into the space between the longer fingers of the opposing die and the diverging walls 51 contain this material to radially inwardly compress the malleable material to effect a staked seal.

Initially the inner tubular part 24 will be smaller in diameter at 60 than the inside diameter 61 of the outer tubular part 25. This establishes a small clearance gap 62. This is customary to aid easy telescoping of these two parts 24 and 25; however, there may be an interference fit wihtout departing from the present invention.

The compression staked surface 31 on the outer wall of this outer part 25 radially compresses the entire circumference of the outer part 25 to a smaller radius as shown at 63. Where the fingers 33-45 are made from separate pieces of material, there may be small radial ridges 64 in the radially compressed area, however, this does not interfere with the effectiveness of the staked seal.

The whole purpose of the compression staked surface 31 is to establish two things: namely, (1) a pressure fluid tight seal between the inner part 24 and outer part 25, and (2) a mechanical interconnection between the parts 24 and 25 which resists longitudinal forces and torsional forces. Using the method as herein described and the die apparatus as herein described, such a seal and a mechanical connection have been provided on a number of materials. For example, aluminum tubing, copper tubing, brass, steel and the like may be compression stake sealed onto inner tubular parts of the same or different materials. The teeth 55 have the junction wall 56 of the second and fourth teeth circumferentially displaced from the junction walls of the first, third and fifth teeth. In this preferred embodiment this is a first arc of about 45°. These teeth 55 may be considered as intermeshing and also as being interrupted teeth in a circumferential direction. The junction walls 56 of adjacent teeth face in opposite directions and each junction wall 56 faces primarily in an arcuate or circumferential direction and is a wall which extends between the respective merging wall and the radially compressed area 53.

The effect of these teeth 55 is to establish a zig-zag seal path 68 at the junction between the inner and outer parts 24 and 25. It is difficult to get these two parts separated once they have been connected, but the indentations establishing the zig-zag seal path 68 may be discerned and lie generally radially beneath the outlines of the interrupted teeth 55, which establish a form of herringbone pattern. The zig-zag seal path 68 is formed by intermeshing seal areas 69 which lie generally radially beneath each of the merging walls 57. This radial deformation which establishes the zig-zag seal path 68, is not as great as that which establishes the toothed area 54, however, it is present and helps to interlock the two parts to help resist both longitudinal and torsional forces. It will be noted that this zig-zag seal path 68 has a longitudinal length longer than the longitudinal length of the dies 14 or 15, which is the longitudinal length of the compression staked surface 31. If the compression dies 14 and 15 were ordinary dies with only a semi-cylindrical recess therein, and no fingers, then there would be no toothed area and instead there would only be a longitudinal flash on the outside of the tube wall. In such case the attempted staking by this prior art method would establish a leakage path along a line 70, which would extend substantially longitudinally the full length of the compression staked surface. This has been found to be unsatisfactory in providing a fluid pressure tight seal and the present invention provides the much longer zig-zag 68 to effectively seal together the inner and outer parts 24 and 25.

In the toothed area 54 the shear walls 58 extend both longitudinally and radially with the radial direction being substantially along a plane normal to the axis of the tubular parts. In the zig-zag seal paths 68, this path extends both longitudinally and circumferentially and is at a substantially constant radial distance from the axis of these tubular parts.

Figure 7:
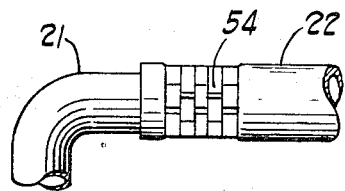
Figure 9:
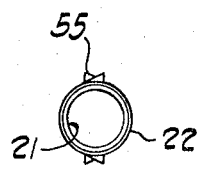
FIG. 9 is an end view of the fitting of FIG. 8.
Figure 8:
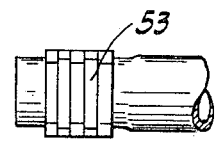

FIG. 6 illustrates the compression staked surface 31 as being applied to an outer tubular part, the inner part not being shown for simplicity. FIG. 8 and FIG. 9 are two views 90° displaced from each other with FIG. 8 showing a front view of the radially compressed area 53 with an elevational view of the radially compressed area 53 and FIG. 7 has an elevational view of the toothed area 54. The various FIGS. 7, 8 and 9 show that the inner part 21 or 24 may be of any shape, for example, it may be any type of fitting either L or T or otherwise to which the outer tubular part is to be joined. FIG. 9 shows an end view of the tubular parts after staking showing the radially protruding teeth 55.

The dies and method can be used with or without reinforcing sleeves either inner or outer, depending upon the forces and pressures which must be resisted for the particular applications. The present method and article is less expensive than many of the various other forms of connecting materials such as flared tube fittings, fitted joints, with nuts and compression sleeves, or by soldering, brazing, welding, clamping and so forth. Where a relatively soft outer tubular part is used, for example, aluminum, a stronger sleeve such as steel may be used on the outside, or may be used on the inside of the inner tubular part. The compression action of the dies 14 and 15 will act through such outer sleeve to compress the two tubular parts together to effect the staked seal.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for compression staking radially inner and outer tubular parts for a fluid pressure tight seal, comprising in combination,
    a first die and a second die,
    a recess in the confronting edge of each said die to receive the tubular parts,
    each of said dies including at least first and second adjacent fingers,
    said first finger of said first die being shorter than said second finger of said first die so that said second finger protrudes in the direction of said second die,
    said first finger of said second die being longer than said second finger of said second die to protrude in the direction of said first die,
    said longer fingers complementarily intermeshing with the shorter fingers of the opposing die,
    whereby said dies may be moved together to close on the tubular parts in the space defined by said recesses,
    and means on said dies to establish on the outer surface of the outer tubular part a toothed area of a plurality of teeth with generally radially and partly circumferentially extending shear walls to establish a fluid pressure tight seal between the parts having a zigzag seal path established by the intermeshing of the die fingers with such zigzag path having a longitudinal length greater than the longitudinal length of the dies.

2. Apparatus as set forth in claim 1, wherein said toothed area is radially compressed on the inner tubular part and the zig-zag path extends alternately circumferentially and longitudinally and substantially constantly at the same radial distance from the axis of the tubular parts.

3. Apparatus as set forth in claim 1, wherein said dies include means to establish said toothed area with alternately directed teeth and to establish said zigzag seal path between said parts generally radially inwardly of said alternately directed teeth.

4. Apparatus as set forth in claim 1, including means on said fingers to form the toothed area as interrupted teeth.

5. Apparatus as set forth in claim 4, including means on said fingers to form said interrupted teeth as interrupted in a circumferential direction.

6. Apparatus as set forth in claim 1, including means on said fingers establishing a shear wall in the toothed area with a shear wall being on each tooth adjacent another tooth.

7. Apparatus as set forth in claim 6, including a diverging surface on said longer fingers cooperating with a longer finger on the opposing die to establish said shear walls.

8. Apparatus as set forth in claim 1, including means on said fingers to form an axially directed junction wall on each tooth with said junction wall being adjacent a radially compressed area and having an arcuately directed component.

9. Apparatus as set forth in claim 8, including means on said fingers establishing alternate junction walls as circumferentially displaced.

10. Apparatus as set forth in claim 9, including means on said fingers establishing said alternate junction walls as facing in opposite directions.

11. Apparatus as set forth in claim 1, including means on a longer finger cooperating with a shorter finger on the opposing die to contain the material extruded from the outer tubular part into the teeth to establish radial compression of the outer tubular part at the toothed area.

12. Apparatus as set forth in claim 1, including means on said die fingers to establish a generally radial and longitudinal junction wall on each tooth.

13. Apparatus as set forth in claim 1, including means on said dies to establish said toothed area with alternately directed teeth and with said zigzag seal path being generally radially inwardly of said alternately directed teeth.

14. Apparatus as set forth in claim 1, including means on said dies to establish teeth which are in a herringbone pattern.

15. Apparatus as set forth in claim 1, including means on said dies to establish in a single plane two shear walls one on each of two adjacent teeth.

* * * * *